Dec. 31, 1929.  G. H. BECKMANN  1,741,968
WINDSHIELD HEATER
Filed June 8, 1929
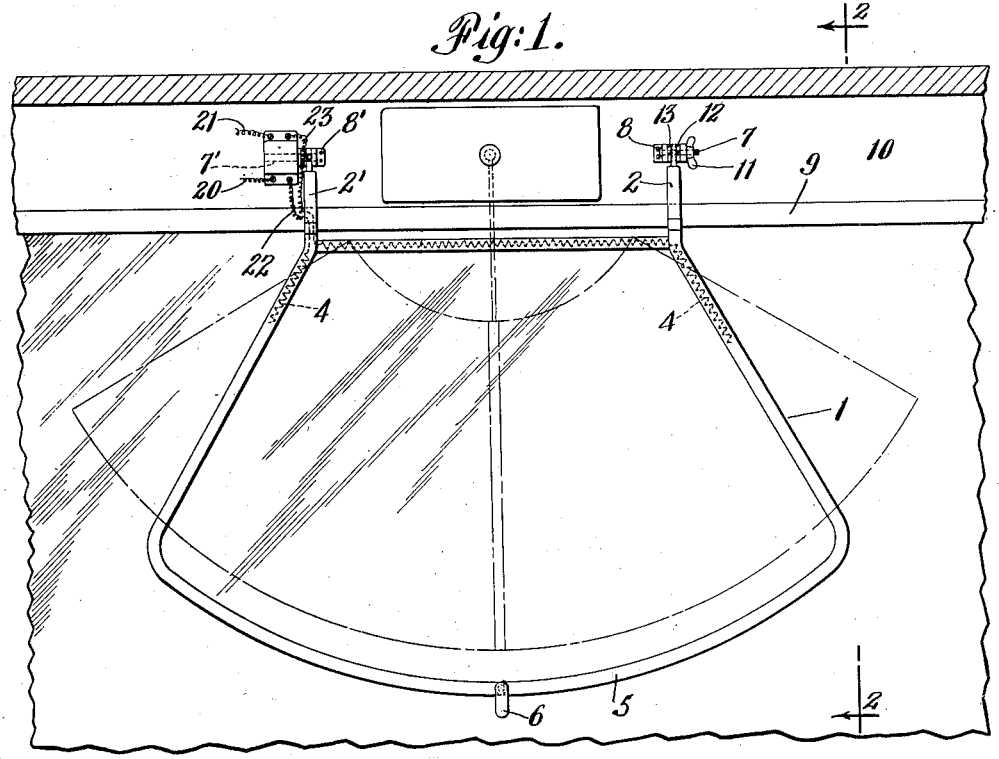
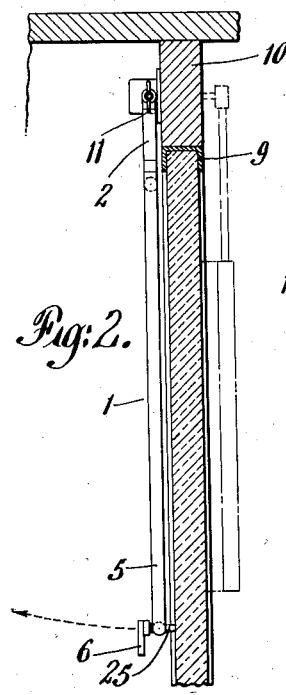
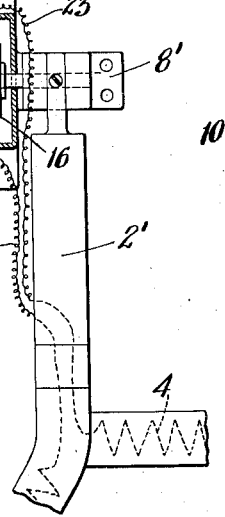
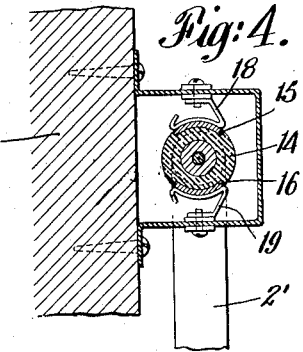
INVENTOR
George Henry Beckmann
BY C. Campbell Hunicke
ATTORNEY Patented Dec. 31, 1929

1,741,968

UNITED STATES PATENT OFFICE

GEORGE HENRY BECKMANN, OF SADDLE RIVER, NEW JERSEY

WINDSHIELD HEATER

Application filed June 8, 1929. Serial No. 369,488.

This invention relates to a windshield heater.

In driving an automobile in the winter time during a snowstorm or in freezing weather the usual windshield wiper does not function in removing ice that may be formed on the windshield. The formation of ice on the windshield glass prevents clear vision and is the cause of eyestrain to say nothing of accidents.

One of the objects of this invention is to provide a device whereby a predetermined area of the windshield may be heated to prevent the formation of ice. Still another object of the invention is to provide a device which will prevent, in a predetermined area of the windshield, the fogging thereof in damp cold weather. Still another object of the device is to provide a heating element for automobiles that may be readily brought into use and one which can be easily rotated out of the way when not in use. Other objects of the invention will appear more fully hereinafter.

Referring to the drawings:

Figure 1 is a view in elevation of a device embodying the principles of my invention secured to the frame above a windshield on each side of the window wiper.

Figure 2 is a cross sectional view of Figure 1 along the line 2, 2, looking in the direction of the arrows.

Figure 3 is a detailed view of the electrical contact switch and a portion of the arm of the device.

Figure 4 is a sectional view of Figure 3 along the line 4, 4, looking in the direction of the arrows.

Figure 5 is a sectional view of the heating element.

In carrying out my invention I propose to provide a metallic frame 1 terminating in two legs 2, 2'. Frame 1 is covered with a heat insulating non-electrical conducting covering preferably of ceramic material. The ceramic material 3 may be grooved to receive and retain the electrical resistance heating wire 4. Semi-circular shield 5 is provided about the wires 4 upon frame 1. The purpose of this shield being to reflect the heat upon the glass and to prevent injury to the top of the car if the device is rotated out of position for use against the top of the car before it has had a chance to properly cool off. A handle 6 of non-heat conducting material is secured to frame 1 to permit manual manipulation. The legs 2, 2', are journaled on shafts 7, 7'. Shafts 7, 7', are supported by brackets 8, 8', bolted or screwed to frame 9 of the windshield or to body 10 of the car above the windshield wiper. Bracket 8 is provided with a wing nut 11 to compress spring washers 12 and 13 in order to cause leg 2 to be tightly held by means of teeth, co-operating with notches on the side of leg 2. This mechanism is to permit of the securing in position of the frame either against the windshield or against the top of the car. Bracket 8' carries an electrical switch which comprises a rotatable shaft 7' carrying sleeve 14 and contacts 15, 16. These contacts 15, 16, engage brushes 17, 18, 19, 20', when the frame is rotated against the windshield and are out of engagement when the frame is raised against the top of the car. Wires 20 and 21 lead from the source of current supply to contacts 18, 19, and wires 22, 23, are connected to contacts 17, 20, and to the heat resistance wires 4.

A foot 25 is secured to frame 1 at the base thereof to prevent the contact of the heating element with the glass in the event of the failure to maintain the proper tension on the locking device 2 in going over rough roads or exceptional vibration or jouncing of the automobile.

While I have shown a frame of four sides shaped in a particular manner to give sufficient strength and the maximum of visability, yet, variation in the shape or structure of the heating element might be made and still fall within the scope of my invention.

It will thus be seen that I have provided a windshield heater that may be readily brought into use and as easily withdrawn from use and one that will deliver directly and most efficiently heat over the desired area of the windshield to maintain it free from ice and fogging on the inside.

What I claim is:

A vehicle window heating device comprising a frame having pivotally mounted above said window means for maintaining said frame against the roof of the vehicle when not in use and means for maintaining said frame against the window when in use, said frame enclosing an area without obstruction to visibility within said area, a heat resisting non-electrical conducting covering over the portion of the frame surrounding said area, an electrical heating coil around said covering, means for supplying an electrical current to said coil when said frame is rotated into position against the window glass and for discontinuing the supply of said current when said frame is rotated away from the window, means to prevent burning of the top of the vehicle when said frame is rotated away from the window, said means comprising a metallic heat reflector covering the back of said electrical heating coil and carried by said frame.

Signed at Palisade, in the county of Bergen and State of New Jersey, this 16th day of May, A. D. 1929.

GEORGE HENRY BECKMANN.